United States Patent
Stadler et al.

(10) Patent No.: US 6,842,787 B2
(45) Date of Patent: Jan. 11, 2005

(54) METHOD AND DEVICE FOR CONVERTING VIRTUALLY CONCATENATED DATA STREAMS INTO CONTIGUOUSLY CONCATENATED DATA STREAMS

(75) Inventors: Andreas Stadler, Vienna (AT); Jürgen Heiles, München (DE); Michael Zapke, München (DE)

(73) Assignee: Siemens AG Osterreich ( * ) Notice: Subject to any disclaimer, the term of this patent is extended or adjusted under 35 U.S.C. 154(b) by 176 days.

(21) Appl. No.: 10/016,399

(22) Filed: Dec. 10, 2001

(65) Prior Publication Data

US 2002/0080812 A1 Jun. 27, 2002

Related U.S. Application Data

(63) Continuation of application No. PCT/AT00/00132, filed on May 15, 2000.

(30) Foreign Application Priority Data

Jun. 10, 1999 (AT) .............................................. 1034/99

(51) Int. Cl.$^7$ .............................................. G06F 15/16
(52) U.S. Cl. ........................ 709/231; 370/464; 370/465; 370/442
(58) Field of Search .......................... 709/231; 370/464, 370/465, 442, 509

(56) References Cited

U.S. PATENT DOCUMENTS 5,257,261 A    10/1993  Parruck et al.  ................ 370/84
5,461,622 A    10/1995  Bleickardt et al.  ............ 370/84
5,809,021 A  *  9/1998  Diaz et al.  .................. 370/364
6,496,519 B1 * 12/2002  Russell et al.  .............. 370/465

* cited by examiner

Primary Examiner—Frantz B. Jean
(74) Attorney, Agent, or Firm—Thomas R. Vigil; Welsh & Katz, Ltd.

(57) ABSTRACT

A method and a device for converting virtually concatenated data streams into contiguously concatenated data streams, wherein the data is transmitted in containers and N containers are combined to form a multiframe, the virtually concatenated data streams consist of X partial data streams/channels, wherein containers which are allocated in each case to the same point in the multiframe are identified by evaluating a multi frame indicator of the container, the time shift of these identified containers of the partial data streams with respect to each other is measured, and in the event of a shift being present only leading containers are delayed so as to ensure that all containers are aligned with respect to time. Each channel (KA1, KA2, ... ) is allocated a pointer interpreter (PI1, PI2), followed by a buffer memory (ES1, ES2) and a pointer generator (PG1, PG2), the pointer generators are synchronized with respect to each other, and each pointer generator is arranged for the purpose of controlling the reading out of the buffer memory associated with its channel, and a channel which is selected as the master channel (KA1) is provided with an overhead inserter (OI1).

19 Claims, 3 Drawing Sheets

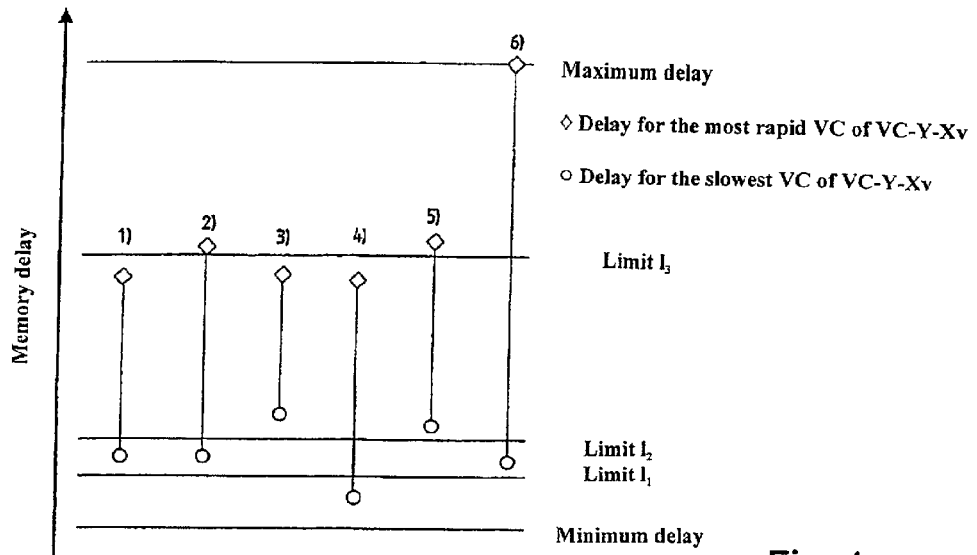
Fig. 4
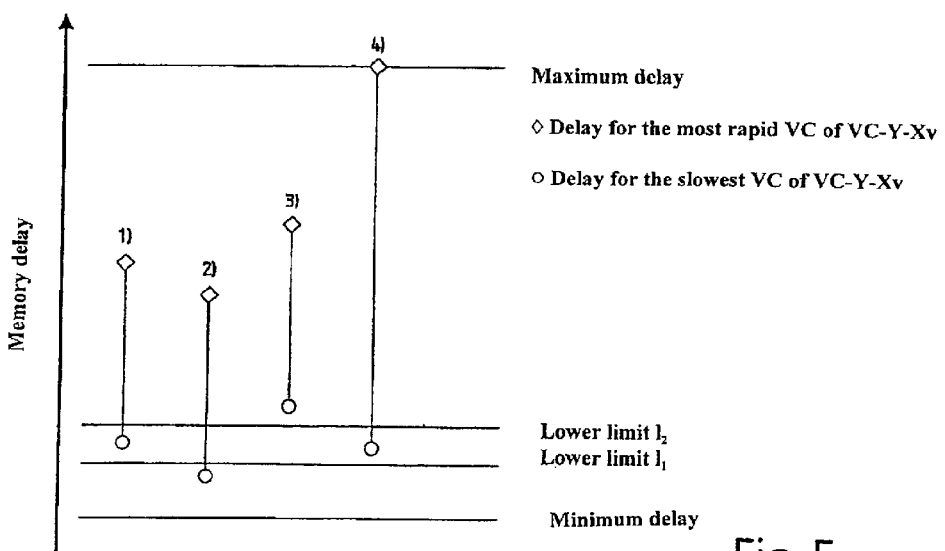
Fig. 5
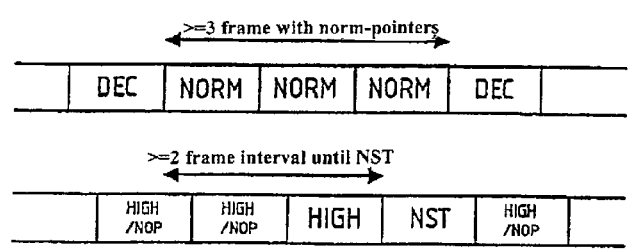
Fig. 6a
Fig. 6b

METHOD AND DEVICE FOR CONVERTING VIRTUALLY CONCATENATED DATA STREAMS INTO CONTIGUOUSLY CONCATENATED DATA STREAMS

This application is a continuation of PCT/AT 00/00132 filed May 15, 2000 which claims priority from Austrian Patent application no. A1034/99 filed Jun. 10, 1999.

BACKGROUND OF THE INVENTION

1. Field of the Invention

The invention relates to a method of converting virtually concatenated data streams into continuous concatenated data streams, wherein the data is transmitted into containers inserted into pulse frames, a sequence of N containers is combined to form a multiframe, each container is provided with a multi frame indicator relating to its position with respect to time within the multiframe, and the virtually concatenated data streams consist of X partial streams/channels.

The invention also relates to a device for the purpose of implementing this method.

2. Description of the Related Art

During the transmission of signals to systems of the SDH-type (synchronous-digital hierarchy) digital signals are introduced into so-called "containers". Further details on this subject are known to the person skilled in the art and are disclosed, for example, in the ITU-Recommendation G.707.

In order to increase the possible data throughput, signals are divided up into several containers which are concatenated to each other. These concatenated containers can be transmitted in a common transmission frame having an appropriate capacity.

For the purpose of concatenating containers, two methods are applied, namely contiguous and virtual concatenation. Both methods provide a contiguous concatenated bandwidth which is proportional to the number X of mutually concatenated containers and to the container size. The difference lies in the transportation between the ends of the transportation path. In the case of the contiguous concatenation method, the coupling of the containers with respect to time is maintained over the entire transportation path, whereas in the case of the virtual concatenation method, the entire signal is divided up into individual virtual containers, these individual containers are transported independently and then recombined at the end point of the transmission to form the entire signal. In the case of virtual concatenation, concatenation-specific devices are only required at the ends of the transmission path, whereas in the case of contiguous concatenation, corresponding devices must generally be provided for each network element.

The start bytes of the containers are indicated by so-called "pointers" which are positioned at predetermined points of the pulse frame. The pointers thus have a fixed position with respect to the frame alignment word contained in the transmission pulse frame and indicate the distance of the container commencement from the pointer by means of a number, e.g. between 0 and 782.

In the case of virtual concatenation, the respective pointer value for each container is used on the transmission-side, but during transmission it is possible for different propagation times for the (sub)containers to occur which are caused, for example, by means of network elements in the transmission path. At the end of the virtually concatenated transmission, such propagation time differences are equalized. This is described in EP 0 429 888 B1 with respect to concatenating subsystem units for bit rates of an intermediate hierarchical order.

BRIEF SUMMARY OF THE INVENTION

In contrast thereto, it is the object of the invention to provide a possibility for converting virtually concatenated containers into contiguous concatenated containers which takes into consideration propagation time differences.

In accordance with the invention, this object is achieved by a method of the type stated in the introduction in that containers which are allocated in each case to the same point in the multiframe are identified by the evaluation of the multiframe indicator, the time shift of these identified individual containers of the partial data streams with respect to each other is measured, in the event of a shift being present only leading containers are delayed in each case by periods of time which ensure that all containers are aligned with respect to time, and in each channel, fill levels of buffer memories are compared with threshold values and in dependence thereon channel-individual stuff-indications are generated and stuffing operations are performed under consideration of the stuff-indications.

The invention has the advantage that it is possible to perform automatic adaptation to different propagation time differences with minimal delay. The invention also permits a convenient possibility for configuring the corresponding device for different concatenation widths or for non-concatenated signals, wherein it is possible to use a modular structure, in which it is possible to minimize the exchange of information between the modules or channels. The communication between the channels is decoupled with respect to time from the data streams, which permits usage of the communication signals for additional concatenated signals and for further tasks which are not of primary importance in this case.

The set object is also achieved by means of a device for the purpose of implementing the method in accordance with the invention, wherein in accordance with the invention each channel is allocated a pointer interpreter, followed by a buffer memory and a pointer generator, the pointer generators are synchronized with respect to each other, and each pointer generator is arranged to control the reading-out from the buffer memory which is associated with its channel, a channel which is selected as the master channel is provided with an overhead inserter which is supplied with the output data from overhead extractors which are disposed downstream of the buffer memories, and the buffer memories are arranged to delay all containers or to align them with respect to time.

BRIEF DESCRIPTION OF THE SEVERAL VIEWS OF THE DRAWINGS

The invention together with further advantages is explained in detail hereinunder with reference to the drawing, in which 1. FIG. 4 shows a symbolic illustration of various fill levels of the buffer memories in a first embodiment of the invention, 5. FIG. 5 shows an illustration according to FIG. 4 of a second embodiment of the invention, and 6. FIGS. 6a and 6b show the sequence of the stuff-indications, which are exchanged for synchronization purposes, and of the generated pointers during negative stuffing, for the second embodiment of the invention.

DETAILED DESCRIPTION OF THE INVENTION

Before explaining an exemplified embodiment of the invention, the structure of the data or data flows which are used in the Synchronous Digital Hierarchy (SDH) shall first be discussed, wherein the invention is not, however, to be limited to a specific system or a specific standard. For example, ihe invention can also be used in the SONET-system (Synchronous Optical Network).

The terms and abbreviations used hereinunder are described in detail, for example, in the ITU-Recommendation G.707 of 03/96, and standardized containers of the type VC-4-Xc are discussed. The structure of such a container is illustrated in FIG. 1 and FIG. 2 shows the virtual concatenation of X (sub)containers of the type VC-4 in conjunction with a VC-4-Xc-container.

Figure 1:
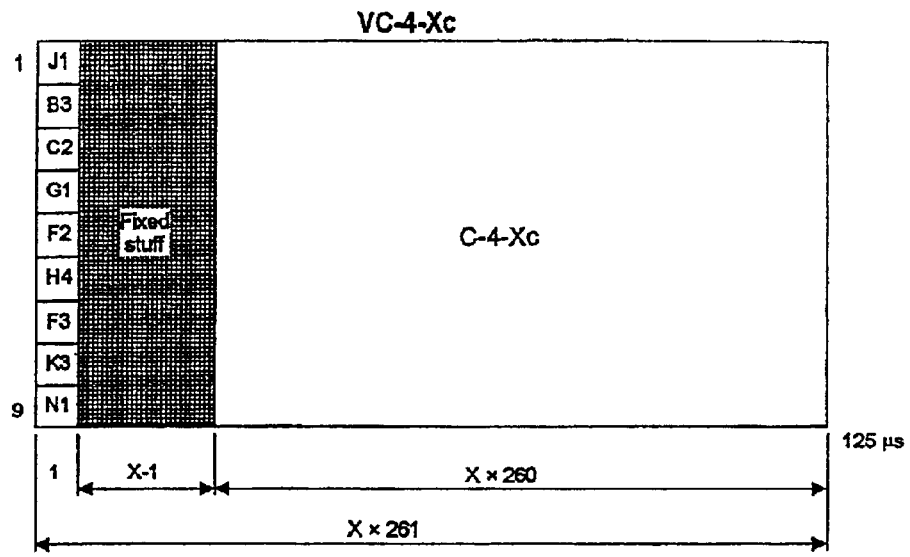
FIG. 1 shows a VC-4-Xc-container according to Recommendation G.707, 2.

With respect to the contiguous concatenation of e.g. 4 or 16 VC-4-containers, it is provided that a VC-4-Xc-container forms a payload region of X containers-4, as illustrated in FIG. 1. A common set of payload-overheads is arranged in the first column and is used for the entire VC-4-Xc-container. For example, the parity formation BIP-8 ("Bit Interleaved Parity") used in this case records all 261* X columns of the VC-4-Xc-container. The columns 2 to X are fixed fill-bits or bytes and can consist purely of "0".

The VC-4-Xc-container is transported in X contiguous AU-4, so-called "Administrative Units", in an STM-N signal (STM is used as an abbreviation for Synchronous Transport Module). The first column of the VC-4-Xc-container is always located in the first AU-4. The pointer of this first AU-4 designates the position of the start-byte of the VC-4-Xc-container. The pointers of the AU-4 no. 2 to X are set to a concatenation indication, in order to indicate the contiguously concatenated payload. The pointer operations, are performed for all X-concatenated AU-4, and X * 3 stuffing-bytes are used. A VC-4-Xc-container provides a payload capacity of 599 040 kbit/s for X=4, and 2 396 160 kbit/s for X=16.

Figure 2:
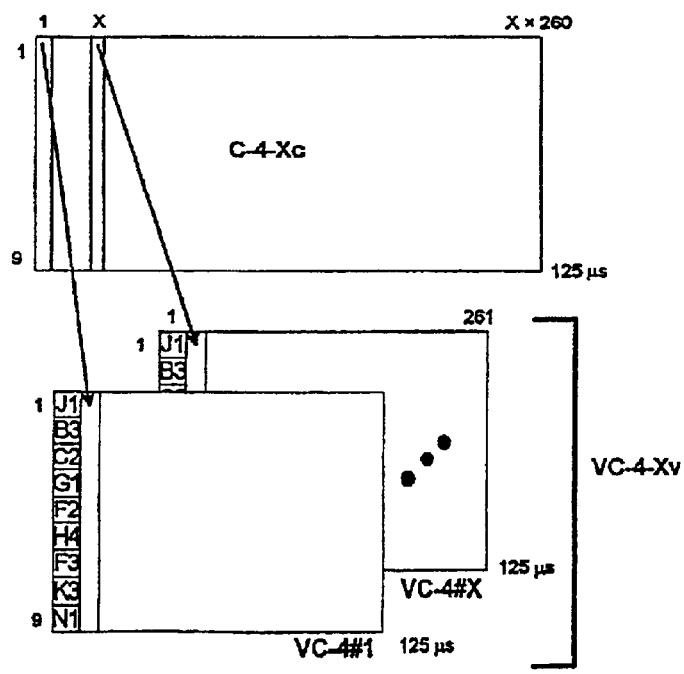
FIG. 2 shows the composition/illustration of a VC-4-Xc-container from individual virtually concatenated sub-containers VC-4, 3.

For the virtual concatenation of X VC-4 containers, a VC-4-Xv, where "v" stands for "virtual", provides a payload region of X containers-4, as illustrated in FIG. 2. The contiguously concatenated container is mapped to X individual VC-4 containers which form the VC-4-Xv. Each VC-4 comprises its "own" path overhead. The overhead byte H4 is used as a specific sequence and multiframe indicator of the virtual concatenation. The term "multiframe" introduced to the specialist field is used in this case for "multi-unit".

Each VC-4 of the VC-4-Xv is transported individually by the network. By reason of the individual transportation, it is possible for the sequence and the alignment with respect to time of the VC-4-containers to change. At the end of the path, the individual VC-4-containers must then be recombined and aligned, in order to restore the contiguously concatenated container. In order to monitor the correct sequence, the sequence indicator in the H4-byte is used. The sequence indicator numbers the individual VC-4-containers of the VC4-Xv from 0 to (X-1). For realignment purposes, the multiframe indicator in the H4 byte and the pointer values of the individual VC-4-containers are used. A 4-bit multiframe indicator provides a 16-frame multiframe.

Figure 3:
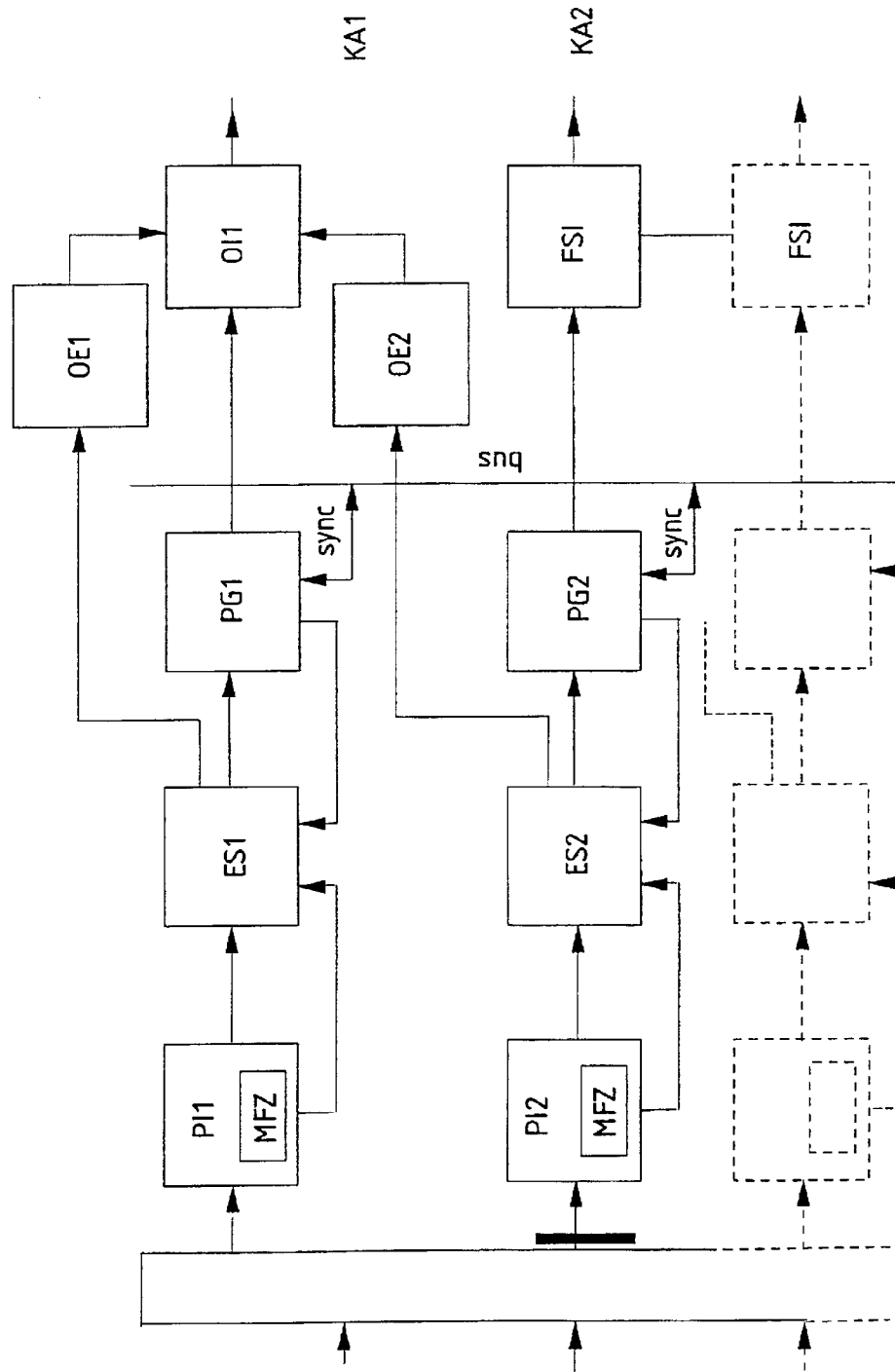
FIG. 3 shows a schematic block diagram of a device according to the invention 4.

Reference will now be made to FIG. 3 which illustrates a device in accordance with the invention for the purpose of converting virtually concatenated partial data streams, which arrive in several channels KA1, KA2, KA3, into contiguously concatenated data streams. Each of these channels corresponds to a time slot of the output signal—a column of the output pulse frame —and serves to transport a VC-4-container. The conversion is described for a VC-4-concatenation, but can also be applied in the same manner to other containers. The data streams initially pass in each channel into a pointer interpreter PI1, PI2, wherein they arrive, for example, from a different network element of the transmission system, and it is optionally possible to preconnect a switching matrix KOP. Each pointer interpreter PI1, PI2 can also contain a multiframe counter MFZ which will be discussed at a later stage in the text. A total of X independent channels is used, wherein for the sake of simplicity the Figure only shows two channels and a third channel is indicated. An essential aspect is the arrangement of a buffer memory ES1, ES2 for each channel, and also of a pointer generator PG1, PG2 in each channel, wherein these local pointer generators are synchronized with respect to each other. Each pointer generator thus controls the read-out from the buffer memory allocated thereto.

One of the channels, in this case channel KA1, is selected as the master channel, and the output data of the buffer memory are transmitted in this channel to a pointer generator PG1 and an overhead inserter OI 1 for the payload. In the remaining channels KA2, KA3 . . . , the output data of the respective buffer memories is transmitted to an overhead extractor OE1, OE2 for the payload, and a data exchange is provided between the overhead inserter OI 1 and the overhead extractor OE2 or the other extractors. The master channel KA1 inserts the pointer into the outgoing STM-signal, whereas the other channels, which can also be designated as "slaves", insert the concatenation indication. The path overhead POH of the VC-4-Xc-containers is generated upon synchronization of the payload from the POH of the VC4-Xv-container.

The pointer buffer ES1, ES2 used in this case is a FIFO-memory for the VC-4-payload and/or the path overhead, wherein the processes of writing to and reading out from the memory are performed with a mutually independent SDH-frame position.

The process of writing to the pointer buffer ES1, ES2 is performed for each VC-4 channel individually using the AU-4 pointers (AU-4=Administrative Unit Level 4 in accordance with G.707) which are associated with the individual sub-containers VC-4 of the VC-Xv, the process of reading out this data is performed for all channels synchronously according to the generated AU-4-Xc-pointer.

In order to configure various concatenations, e.g. X=4, X=16, it is merely necessary to change the number of synchronized channels. However, it is also possible to transport non-concatenated VC4-containers, for which reason it is only necessary to interrupt the synchronization.

The buffer memories ES1, ES2 . . . are controlled in such a manner that the payload of the VC-4-containers or this as a whole is delayed during propagation by a maximum of the maximum propagation time difference between individual VC4-containers. The synchronization mechanism used for this purpose and the stuffing-strategy during operation are also explained in detail hereinunder. It is to be noted primarily that the data streams of the "slave" channels at the output of the device are conveyed by fill-byte inserters FSI.

The allocation of the sub-containers VC-4 to the channels KA1, KA2 . . . of the pointer buffer can be performed by the aforementioned switching matrix KOP, of which the connection matrix can be corrected automatically/manually with respect to the channel allocation in the event of errors which have been identified by the sequence indicator in H4. The outputs of the individual channels are transmitted to a corresponding device for the purpose of forming STM-frames.

Synchronization of the pointer buffer

The synchronized reading out of the buffer memory i.e. the buffer memory ES1, ES2 which is divided up into several channels initially requires a synchronized input procedure upon switching on the device and after the occurrence of alignment errors and after departing from error states of the respective pointer interpreters PI1, PI2 of a channel, and in the further sequence the operations of the pointer generator PG1, PG2 must be performed in a synchronized manner.

For this purpose, the position with respect to time of the data stream which is read out from the buffer memory must be determined relative to the outgoing pulse frame. For example, an H4-identification is transmitted in each channel of the buffer memory ES1, ES2 in parallel with the payload. The identification contains an indicator bit for the position with respect to time, i.e. a bit which denotes a specific position of the container. Therefore, this identification renders it possible to measure the position with respect to time of the container relative to the position of the outgoing transmission pulse frame. Using the H4 byte synchronized multiframe indicator in H4, a pointer value P is formed which describes the position with respect to time of the container relative to the transmission frame. The use of an H4-identification renders it possible in this case to expedite the synchronized input procedure, but it is also possible in the same manner to use an identification for each random VC-4-byte. For example, when using a J1-identification, the determination of the outgoing pointers (H1, H2) is simplified in the master channel KA1.

The pointer value P of each of the X-channels is distributed to the other channels of the VC-4-X-containers. Errors, such as e.g. an AU-AIS of a channel (an Alarm Indication Signal of the Administrative Unit), and errors in the multiframe indicator, in the sequence indicator or a buffer memory overflow or underflow are also signaled by the identifying channel to all other channels.

The 10-bit part on the pointer value as formed by measuring the H4-identification in the pointer generator is protected against bit-errors by filtering the pointer interpreter PI1, PI2 as provided in the standards. The multiframe indicator in the H4-byte is likewise to be filtered as part of the pointer in the pointer interpreter PI1, PI2. The sequence of the multiframe indicator for the pointer generator PG1, PG2 is generated with the aid of the multiframe counter MFZ in the pointer interpreters. To this end, it is noted that the multiframe counters count the individual frames within the multiframe. Upon identifying a new, but valid sequence of multiframe indicators, this is incorporated into the multiframe counter. The identification of an invalid sequence of multiframe indicators by means of several bit-errors in several contiguous H4-bytes of a channel produces an a LOM-state ("Loss of Multiframe") an AU-AIS-setting of the pointer generator PG1, PG2.

Error indications, such as e.g. Trail Signal Fail, AIS or LOP are transmitted by each pointer interpreter via a Signal-Fail-Signal SF to the respective pointer generator PG1, PG2. In the event of an overflow or underflow of the buffer memory ES1, ES2 etc. the signal SF is set. As soon as one of the local pointer generators PG1, PG2 identifies an error, this is signaled to the other local pointer generators and all of the pointer generators produce an AIS-signal for the VC4-Xc.

Synchronized input procedure

Upon switching on the converter, the local pointer generators PG1, PG2 generate an AIS-signal. Write and read pointers of the buffer memory are set to values which correspond to a minimal delay.

If the SF-signal is no longer set, the write-side of the buffer memory ES1, ES2 commences with the writing-in procedure, the read-side starts with the reading-out process. If a local pointer generator PG1, PG2 obtains an H4-identification, then it provides its local pointer value P measured thereby (see above) to all other pointer generators. With each new H-4-identification, the pointer value P is overwritten and the new value is distributed.

As long as the entire pointer generator of the VC-4-Xc-container is in the synchronized input phase, upon receipt of a pointer value $P_{min}$, which is smaller than its own pointer value P, each local buffer memory ES1, ES2 resets its read pointer RP by the value of the difference between its own pointer value and the pointer value obtained. Of course, it is necessary to take into consideration the cyclical nature of the pointer values.

$$RP_{new} = RP_{old} - (P - P_{min})$$

As a consequence, the delay time thereof is increased suddenly. This synchronized input procedure is terminated within an STM-frame upon receipt of the first H4-identification. The buffer memory of the channel, which has obtained its H4-byte last, comprises the minimal delay which is set by adjusting the write and read pointers with the signal SF, all other buffer memories comprise an additional delay which corresponds to the time lead of the VC-4 at its input.

Alignment and sequence control

If the buffer memory depth is not sufficient for the purpose of equalizing VC-4-propagation time differences, then a channel KA1, KA2 identifies an overflow of its buffer memory ES1, ES2 (the write-address has caught up or overtaken the read-address). The channel issues a "Loss of Alignment" LOA to all other channels, all of the pointer generators PG1, PG2 produce an AIS-signal and commence with a new synchronized input procedure.

The sequence indicators of the individual channels are filtered for bit-errors. For example, if several sequence indicators do not correspond in sequence with the sequence indicator determined from the channel number, the channel transmits an SQM-message to all other channels, and all channels jointly generate an AIS-signal. The filtered sequence indicators of the individual channels can be read, so that in the case of such errors SQM (=Sequence Mismatch) the channels can be newly allocated in the switching matrix KOP. In addition to or instead of the sequence indicators, it is also possible to read and evaluate so-called "Path Traces", in order to control a preconnected switching matrix. Path traces serve to identify the connection path, are transmitted by a sequence of J1-bytes and are defined in the ITU-Recommendation G707.

Synchronization of the pointer operations

Method 1

Each local buffer memory ES1, ES2 calculates its current fill level value, e.g. by means of communication via an STM-line and monitors the situations in which the threshold 13 is exceeded and the value does not achieve the thresholds $l_1$ and $l_2$ (see FIG. 4). The lower threshold $l_1$ equal to the sum of the minimum delay $d_{ES.min}$, duration of the SOH.gap $t_{SOH}$, duration of the positive stuffing-byte $t_{H3+}$ and maximum skew between the buffer memory input clock pulse t0 and its output clock pulse $t0s$ $t_s$: $l_1=d_{ES.min}+3+l+t_s$. (The information is provided in this case in triple bytes, as addressed per pointer). If the frame start matches on both sides of the pointer buffer, the SOH-gap duration does not need to be taken into consideration.

A minimum delay $d_{ES.min}>0$ is advantageous in order to equalize any delay in the POH with respect to the payload which can be conditioned by an Inter-ASIC-communication which is required for the purpose of exchanging the POH between the VC-4-channels of a concatenated VC-4.

The following applies to the threshold $l_2$ $$l_2=l_1+h+t_s$$

The upper stuffing-threshold $l_3$ is determined in a dynamic manner. For each synchronization procedure, it is set to $$l_3=l_1-P_{max}-P_{min}+h+t_3$$

$P_{max}-P_{min}$ ... Difference between the maximum and minimum pointer value during the synchronization procedure or to $$l_3=d_{ES.max}-4t_s$$

depending on which value is the smaller. The difference $P_{max}-P_{min}$ is formed by each channel KA1, KA2 independently by means of the available pointer values of all channels.

The pointer generator PG1, PG2 of each channel KA1, KA2 communicates to all other channels one of four possible states. These states are:

PST ("positive stuffing"): the dedicated channel does not achieve the threshold $l_1$ (fill level f<$l_1$)

LINC ("limit increment"): the dedicated channel achieves the threshold $l_1$, but does not achieve threshold $l_2$ ($l_1$ f<$l_2$), LDEC ("limit decrement"): the dedicated channel fails to achieve neither the threshold $l_2$, nor is threshold $l_3$ exceeded ($l_2$ f $l_3$), NST ("negative stuffing"): the dedicated channel exceeds the threshold $l_3$(f>$l_3$).

In the case of PST of at least one channel, positive stuffing is performed in all channels after the minimum stuffing interval of three frames is maintained. In the case of NST of at least one channel and LDEC of all other channels, negative stuffing is performed in all channels after the minimum stuffing interval of three frames is maintained. In the case of NST of at least one channel, at least one LINC of another channel and LDEC of the remaining channels, the threshold $l_3$ is incremented in the next frame. In the case of LDEC of all channels, the threshold $l_3$ is decremented in the next frame.

The threshold references and the signaled states are evaluated in all local pointer generators PG1, PG2 simultaneously, for example with the H1-byte.

In FIG. 4, six possible situations are illustrated symbolically in the buffer memory ES1, ES2:

1) In the steady state, it is not necessary to perform any stuffing operations and any threshold-adaptations. At least one channel issues the message LINC, and the remaining channels issue the message LDEC.

2) The buffer memory delay for the most rapid VC-4- as seen at the buffer memory input —exceeds the threshold $l_3$ (message NST), the slowest VC-4 fails to achieve the threshold $l_2$ (message LINC): the threshold $l_3$ is incremented in the next frame of all channels.

3) The buffer memory delay of all channels is between $l_2$ and $l_3$. All channels issue an LDEC message and decrement the threshold $l_3$ in the next frame.

4) The buffer memory delay for the slowest VC-4 fails to achieve the threshold $l_1$ (message PST), the remaining channels issue the messages LINC, LDEC or NST. The delay must be increased for all channels. Positive stuffing of all channels is performed in one of the next frames, as soon as the minimum stuffing interval is maintained.

5) At least for the most rapid VC-4, the buffer memory delay exceeds the threshold 13 (message NST), all other delays are $l_2$ (issue message LDEC). The delay must be reduced for all channels. Negative stuffing of all channels is performed in one of the next frames, as soon as the minimum stuffing interval is maintained.

6) The difference between the propagation times of the VC-4's of the VC-4-Xv exceeds the maximum equalizable value. At least one channel signals LOA (=Loss of Alignment). New synchronization is triggered and AU-AIS is introduced into the outgoing signal.

Method 2

Each local buffer memory ES1, ES2 calculates—e.g. by averaging over an STM-line—its current fill level value and monitors the situations in which the threshold $l_2$ is exceeded and the value does not achieve threshold $l_1$. In comparison with method 1, the lower threshold $l_1$, is equal to the sum of buffer memory minimum delay $d_{ES.min}$, SOH-gap duration, duration of the SOH-stuffing byte and maximum skew $t_S$ between the buffer memory input clock pulse t0 and its output clock pulse $t0_s$:

$$l_1=d_{ES.min}+3+1+t_s$$

The following applies to the upper threshold $l_2$:

$$l_2=l_1+h+t_s$$

The pointer generator PG1, PG2 of each channel KA1, KA2 transmits one of four possible states to all other channels. These states include:

PST: is assumed after two frames with normal pointers, if the dedicated channel fails to achieve the threshold $l_1$, NST: is assumed after two frames with normal pointers, if all channels have signaled HIGH in the preceding frame and the dedicated channel exceeds the threshold $l_2$, HIGH: dedicated channel exceeds the threshold 12 but the condition for NST is not met, NOP: in all remaining cases. The local pointer generator does not have any requirement for pointer operations, and it is not necessary for any actions of the other pointer generators to be performed. (NOP=no operation).

In the event of PST of at least one channel, positive stuffing is performed in the next frame in all channels. In the event of NST of one channel, negative stuffing is performed in the next frame in all channels.

The evaluation of the threshold references and the signaled states is performed in all local pointer generators simultaneously, for example with the H1-byte.

FIG. 5 illustrates in a symbolic manner four possible situations in the buffer memory ES1, ES2:

1) In the steady state, it is not necessary to perform any stuffing operations. At least one channel issues the message NOP, the remaining issue HIGH.

2) The buffer memory delay for the slowest VC-4- as seen at the buffer memory input—fails to achieve the threshold $l_1$. The delay must be increased for all channels. Positive stuffing of all channels is performed, as soon as the minimum stuffing interval is maintained. At least one channel then issues the message PST, the other channels issue the message NOP or HIGH.

3) The buffer memory delay also exceeds the threshold 12 for the slowest VC-4. The delay must be reduced for all channels. Negative stuffing of all channels is then performed, as soon as the minimum stuffing interval is maintained (see FIGS. 6a, b). All channels initially issue the message HIGH and in one of the next frames whilst maintaining the stuffing interval NST. FIG. 6a shows the sequence with respect to time of the transmission pulse frame with generated pointer indications and FIG. 6b shows the sequence with respect to time of the stuff-indications (SI) of a channel.

4) The difference between the propagation times of the VC-4's of the VC-4-Xv exceeds the maximum equalizable value. At least one channel signals "LOA". New synchronization is triggered and AU-AIS is introduced into the outgoing signal.

Synchronicity of the pointer generators

Owing to the synchronized stuffing operations and the distribution of defects, all local pointers have the same value P and also the INC- and DEC-operations of the local pointer generators are synchronous (INC=increment, DEC=decrement). If all pointers jump synchronously at the input of the device, then the pointers of all channels also jump synchronously in the local pointer generators PG1, PG2, and in the outgoing signal (NDF=new data flag) is set in the pointer by the pointer generator PG1. If an error in the transmission path of a part-VC-4 causes an individual pointer to jump, then all channels follow this jump by newly setting their buffer memory read pointers, as in the case of the synchronized input procedure, and the pointer generator PG1 likewise sets the NDF-indication. However, in the case of unfavourable fill levels of the buffer memories—the fill levels do not start here with their minimum value as is the case during synchronized input—local buffer memory overflow and underflow can occur, which leads to a new synchronization procedure as described above.

We claim:

1. Method of converting virtually concatenated data streams into continuously concatenated data streams, wherein the data is transmitted in containers which are inserted into pulse frames, a sequence of N containers is combined to form a multiframe, each container is provided with a multiframe indicator relating to its position with respect to time within the multiframe, and the virtually concatenated data streams consist of X partial data streams/channels, characterized in that containers which are allocated in each case to the same point in the multiframe are identified by evaluation of the multiframe indicator, the time shift of these identified individual containers of the partial data streams with respect to each other is measured, in the event of a shift being present only leading containers are delayed in each case by periods of time which ensure that all containers are aligned with respect to time, and in each channel fill levels of buffer memories are compared with threshold values and in dependence thereon channel-individual stuff-indications are generated and stuffing operations are performed under consideration of the stuff-indications of all channels.

2. Method according to claim 1, characterized in that the time shift of the individual containers is measured using the pointer values of the containers.

3. Method according to claim 1, characterized in that the containers are buffered, wherein the writing-in procedure is performed individually for each partial data stream and the reading-out procedure is performed in a synchronized manner for all partial data streams.

4. Method according to claim 1, characterized in that the synchronization of the partial data streams is performed by exchanging time reference values and/or stuff-indications and defect indicators.

5. Method according to claim 1, characterized in that the communication between the containers as required for the purpose of aligning the containers with respect to time is performed in a decoupled manner with respect to time.

6. Method according to claim 1, characterized in that the fill levels are determined by forming an average value over an integer multiple of a pulse frame line.

7. Method according to claim 1, characterized in that the fill levels are determined at a defined point in time relative to the outgoing and/or received pulse frame.

8. Method according to claim 1, characterized in that buffer memory read pointers are reset in each channel individually by the difference between the dedicated pointer value and the pointer value mentioned by a neighboring channel, in order to increase the dedicated channel delay by this value.

9. Method according to claim 1, characterized in that from the incoming containers it is also possible to read and evaluate sequence indicators and/or path traces and accordingly a preconnected switching matrix is controlled.

10. Method according to claim 1, characterized in that the read multiframe indicators and/or sequence indicators are filtered for bit-errors.

11. Method according to claim 1, characterized in that in order to generate the overheads in the outgoing data streams the data streams which are aligned with respect to time are utilized.

12. Method according to claim 1, characterized in that the minimum delay of the containers is raised, in order to compensate for the time difference in the transmission of that data between the channels which is required for the purpose of generating the overheads.

13. Method according to claim 1, characterized in that where the buffer memory of at least one channel fails to achieve a fixed minimum fill level, the delay of all partial data streams is increased by a positive-stuffing operation.

14. Method according to claim 1, characterized in that where a fixed maximum fill level in each of the channels is exceeded, the delay of all partial data streams is reduced by a negative-stuffing operation.

15. Method according to claim 1, characterized in that the fill levels of buffer memories are compared with dynamically adaptable threshold values, wherein in the event that a dynamically adaptable threshold is exceeded:

the dynamically adaptable threshold value is incremented when any other channel fails to achieve a further, predeterminable fixed threshold value, the delay of all partial data streams is reduced by means of a negative-stuffing operation when the fixed threshold value is exceeded by the fill levels of all channels, and the dynamically adaptable threshold value is decremented upon the dynamically adaptable threshold value not being achieved and at the same time the fixed threshold value being exceeded by the buffer memory fill levels of all channels.

16. Device for the purpose of implementing the method according to claim 1, characterized in that each channel (KA1, KA2, . . . ) is allocated a pointer interpreter (PI1, PI2), followed by a buffer memory (ES1, ES2) and a pointer generator (PG1, PG2), the pointer generators are synchronized with respect to each other, and each pointer generator is arranged for controlling the reading-out from the buffer memory associated with its channel, a channel which is selected as a master channel (KA1) is provided with an overhead inserter (OI1), to which is supplied the output data from overhead extractors (OE1, OE2) which are disposed downstream of the buffer memories (ES1, ES2), and the buffer memories (ES1, ES2) are arranged for delaying all of the containers or aligning them with respect to time.

17. Device according to claim 16, characterized in that in the slave channels (KA2, KA3) a fill byte inserter (FSI) follows on in each case from the pointer generators (PG2, PG3).

18. Device according to claim 16, characterized in that in order to align with respect to time the partial data streams in the pointer interpreters (PI1, PI2), multiframe counters (MFZ) are provided which are synchronized by the multiframe indicators of the input data streams in such a manner as to be bit-error-tolerant.

19. Method of converting virtually concatenated data streams into continuously concatenated data streams, wherein the data is transmitted in containers which are inserted into pulse frames, a sequence of N containers is combined to form a multiframe, each container is provided with a multiframe indicator relating to its position with respect to time within the multiframe, and the virtually concatenated data streams consist of X partial data streams/ channels, containers which are allocated in each case to the same point in the multiframe are identified by evaluation of the multiframe indicator, the time shift of these identified individual containers of the partial data streams with respect to each other is measured, in the event of a shift being present leading containers are delayed in each case by periods of time which ensure that all containers are aligned with respect to time, characterized in that the containers are buffered, the writing-in procedure is performed individually for each partial data stream and the reading-out procedure is performed in a synchronized manner for all partial data streams, in each channel, fill levels of buffer memories are compared with threshold values, in dependence thereon channel-individual stuff-indications are generated and stuffing operations are performed under consideration of the stuff-indications of all channels, wherein the synchronization of the partial data streams is performed by exchanging time reference values and stuff-indications.

* * * * *